US010521597B2

(12) United States Patent
Reyes et al.

(10) Patent No.: US 10,521,597 B2
(45) Date of Patent: Dec. 31, 2019

(54) COMPUTING DEVICE AND METHOD FOR INPUT SITE QUALIFICATION

(71) Applicant: McKesson Corporation, Irving, TX (US)

(72) Inventors: Levi Chloe Reyes, Alpharetta, GA (US); Brad Ewing, Covington, GA (US); Seth Phillips, Atlanta, GA (US); Richard K. Selby, Atlanta, GA (US); Soranarom Kumsaitong, Alpharetta, GA (US)

(73) Assignee: MCKESSON CORPORATION, Irving, TX (US)

(*) Notice: Subject to any disclaimer, the term of this patent is extended or adjusted under 35 U.S.C. 154(b) by 124 days.

(21) Appl. No.: 15/476,157

(22) Filed: Mar. 31, 2017

(65) Prior Publication Data

US 2018/0285577 A1    Oct. 4, 2018

(51) Int. Cl.
*G06F 21/60* (2013.01)
*G06F 16/22* (2019.01)

(52) U.S. Cl.
CPC ........ *G06F 21/604* (2013.01); *G06F 16/2282* (2019.01)

(58) Field of Classification Search
CPC ............. H04L 63/0236; G06F 21/604; G06F 17/30339; G06F 19/3456; G06F 19/3475; G06F 19/32833; G06F 19/328; G06F 2221/2111; G06F 16/2282
See application file for complete search history.

(56) References Cited

U.S. PATENT DOCUMENTS

| | | | |
|---|---|---|---|
| 2002/0035484 A1* | 3/2002 | McCormick | G06Q 50/22 705/2 |
| 2013/0297333 A1* | 11/2013 | Timmons | G06F 19/3456 705/2 |
| 2014/0358578 A1* | 12/2014 | Ptachcinski | G06Q 30/0201 705/2 |
| 2015/0278924 A1 | 10/2015 | Maurer et al. | |
| 2016/0042147 A1 | 2/2016 | Maurer et al. | |
| 2016/0092642 A1 | 3/2016 | Maurer et al. | |
| 2017/0134407 A1* | 5/2017 | Mason | H04L 63/1416 |
| 2018/0262496 A1* | 9/2018 | Namboodiri | H04L 67/327 |

\* cited by examiner

*Primary Examiner* — Alexander Lagor
*Assistant Examiner* — Vu V Tran
(74) *Attorney, Agent, or Firm* — Alston & Bird LLP (57) ABSTRACT

A computing device, method and computer program product are provided to qualify an instruction based upon the input site of the instruction. In the context of a computing device, the computing device includes data field analysis circuitry to analyze data fields representing a respective instruction that has been received to determine a data field that defines the input site of the respective instruction. The computing device also includes data field comparison circuitry to compare the data field that defines the input site to an eligible input site inclusion listing to determine whether the input site of the instruction is included. The computing device also includes qualification test circuitry to perform one or more additional qualification tests and instruction qualification circuitry to qualify the instruction when the input site is included within the eligible input site inclusion listing and in which the one or more additional qualification tests are satisfied.

20 Claims, 4 Drawing Sheets

COMPUTING DEVICE AND METHOD FOR INPUT SITE QUALIFICATION

TECHNOLOGICAL FIELD

An example embodiment relates generally to computing devices, methods and computer program products for qualifying instructions in accordance with predefined requirements and, more particularly, to qualifying instructions at least partially based upon their input site.

BACKGROUND

Instructions are issued for a wide variety of purposes in a large number of industries. Frequently, the instructions and various characteristics of the instructions must be examined in accordance with a number of requirements in order to determine whether the instructions satisfy the requirements and are therefore qualified. The qualification of such instructions may be performed for various purposes including the determination as to whether the instructions and/or actions taken in response to the instructions are to be considered eligible for participation in a particular program.

Among the various characteristics of instructions that are examined in conjunction with a determination as to whether or not an instruction satisfies the various requirements and is qualified is the written location at which the instruction is written. In this regard, the same instruction may be provided at any of a number of different locations, only some of which satisfy the requirements for qualification of the instruction. However, information regarding the written location of an instruction has not generally been captured and provided and, as such, it has been difficult to determine with any certainty whether the location at which an instruction was written satisfied the requirements for qualification of the instruction. Techniques have been developed to evaluate one or more other characteristics associated with an instruction and to utilize a comparison of those one or more characteristics with various requirements in order to approximate the written location of the instruction and the satisfaction, or not, by the approximate written location of the requirements for qualification. However, such an approximation of a written location of the instruction may materially diminish the accuracy with which an instruction may be qualified since the approximation of the written location may, in some circumstances, be incorrect and may differ from the actual written location such that the resulting determination regarding the qualification of the instruction may be errant.

BRIEF SUMMARY

A computing device, method and computer program product are provided in accordance with an example embodiment in order to qualify an instruction at least partially based upon the input site of the instruction. By considering the actual input site of the instruction during the qualification process, the computing device, method and computer program product of an example embodiment may determine whether the input site satisfies the qualification requirement in a more accurate manner such that the resulting qualification determination is correspondingly established in a more accurate manner. Further, by considering the actual input site of the instruction, the computing device, method and computer program product of an example embodiment may eliminate one or more qualification tests that have sometimes been previously performed to approximate the input site, thereby increasing the efficiency of the qualification process and correspondingly reducing the processing resources and the processing time required to more accurately qualify an instruction, such as for program eligibility.

In an example embodiment, a computing device is provided that is configured to qualify an instruction at least partially based upon an input site of the instruction. The computing device concludes a memory defining a plurality of tables and configured to store an eligible input site inclusion listing in a first table. The eligible input site inclusion listing includes one or more sites at which an instruction is permitted to be input. The computing device also includes a communication interface configured to receive a file including one or more instructions. Each instruction is represented by a plurality of data fields. At least one data field defines an input site of the respective instruction. The computing device also includes data field analysis circuitry configured to analyze the data field to representing a respective instruction to determine the at least one data field that defines the input site of the respective instruction. The computing device also includes data field comparison circuitry configured to compare the at least one data field that defines the input site of the respective instruction to the eligible input site inclusion listing to determine whether the input site of the respective instruction is included within the eligible input site inclusion listing. The computing device also includes qualification test circuitry configured to perform one or more additional qualification tests with respect to one or more other data fields of the respective instruction. The computer device further includes instruction qualification circuitry configured, in an instance in which the input site of the respective instruction is included within the eligible input site inclusion listing and in which the one or more additional qualification tests are satisfied, to qualify the respective instruction. The memory is further configured to store in a second table an indication of the respective instruction that has been qualified. Further, the communication interface is additionally configured to provide information regarding the respective instruction that has been qualified.

The memory of an example embodiment is also configured to store in a third table a listing of people eligible to issue instructions. In this example embodiment, the qualification test circuitry is configured to determine that an additional qualification test is satisfied in an instance in which the instruction is determined to have been issued by a person included in a listing of people eligible to issue instructions. In an example embodiment, the instruction identifies the subject. The qualification test circuitry of this example embodiment is configured to determine that an additional qualification test is satisfied in an instance in which the subject of the instruction is determined to have been provided.

In an instance in which the instruction fails to identify a subject, the qualification test circuitry of an example embodiment is configured to determine the subject of the instruction based upon other information included with the instruction and to determine that an additional qualification test is satisfied in an instance in which the subject of the instruction that has been determined is thereafter determined to have been provided. A computing device of an example embodiment also includes input site determination circuitry configured to perform, in an instance in which the input site of the respective instruction is not included within the eligible input site inclusion listing, one or more further qualification tests in addition to the one or more additional qualification tests performed by the qualification test circuitry. In this example embodiment, the instruction qualification circuitry is also configured, in the instance in which the input site of the respective instruction is not included within the eligible input site inclusion listing, to qualify the respective instruction in an instance in which the one or more additional and further qualification tests are satisfied.

In another example embodiment, a method is provided for qualifying an instruction at least partially based upon an input site of the instruction. The method includes storing an eligible input site inclusion listing in a first table maintained by memory. The eligible input site inclusion listing includes one or more sites at which an instruction is permitted to be input. The method also includes receiving, via a communication interface, a file including one or more instructions. Each instruction is represented by a plurality of data fields. At least one data field defines an input site of the respective instruction. The method also includes analyzing, with data field analysis circuitry, the data field is representing a respective instruction to determine the at least one data field that defines the input site of the respect instruction. The method also includes comparing, with data field comparison circuitry, the at least one data field that defines the input site of the respective instruction to the eligible input site inclusion listing to determine whether the input site of the respective instruction is included within the eligible input site inclusion listing. The method also includes performing, with qualification tests circuitry, one or more additional qualification tests with respect to one or more other data fields of the respective instruction. In an instance in which the input site of the respective instruction is included within the eligible input site inclusion listing and in which the one or more additional qualification tests are satisfied, the method also includes qualified, with instruction qualification circuitry, the respective instruction. The method also includes storing in a second table maintained by the memory an indication of the respective instruction that has been qualified. The method further includes to providing information, via the communication interface, regarding the respective instruction that has been qualified.

The method of an example embodiment also includes storing in a third table maintained by the memory a listing of people eligible to issue instructions. The method of this example embodiment performs one or more additional qualification tests by determining, with the qualification test circuitry, that an additional qualification test is satisfied in an instance in which the instruction is determined to have been issued by a person included in the listing of people eligible to issue instructions. In an example embodiment, the instruction identifies the subject. The method of this example embodiment performs one or more additional qualification tests by determining, with the qualification test circuitry, whether an additional qualification test is satisfied in an instance in which the subject of the instruction is determined to have been provided.

The method of an example embodiment performs one or more additional qualification tests by determining, in an instance in which the instruction fails to identify the subject, the subject of the instruction based upon other information included within the instruction and determining that an additional qualification test is satisfied in an instance in which the subject to the instruction that has been determined is thereafter determined to have been provided. In an instance in which the input site of the respective instruction is not included within the eligible input site inclusion listing, the method of an example embodiment may also include performing, with input site determination circuitry, one or more further qualification tests in addition to the one or more additional qualification tests performed by the qualification test circuitry. In this example embodiment, the method also includes to qualifying, with the instruction qualification circuitry, the respective instruction in an instance in which the one or more additional and further qualification tests are satisfied.

In a further example embodiment, a computer program product is provided that includes at least one non-transitory computer-readable storage medium for qualifying an instruction at least partially based upon an input site of the instruction. The at least one non-transitory computer-readable storage medium stores computer-executable instructions that, when executed, cause the computing device to cause an eligible input site inclusion listing to be stored in a first table maintained by memory. The eligible input site inclusion listing includes one or more sites at which an instruction is permitted to be input. The computer-executable instructions, when executed, also cause the computing device to receive a file including one or more instructions. Each instruction is represented by a plurality of data fields. At least one data field defines an input site of the respective instruction. The computer-executable instructions, when executed, also cause the computing device to analyze the data fields representing a respective instruction to determine the at least one data field that defines the input site of the respective instruction. The computer-executable instructions, when executed, also cause the computing device to compare the at least one data field that defines the input site of the respective instruction to the eligible input site inclusion listing to determine whether the input site of the respective instruction is included within the eligible input site inclusion listing. The computer-executable instructions, when executed, also cause the computing device to perform one or more additional qualification tests with respect to one or more other data fields of the respective instruction. The computer-executable instructions, when executed, also cause the computing device to qualify the respective instruction in an instance in which the input site of the respective instruction is included within the eligible input site inclusion listing and in which the one or more additional qualification tests are satisfied. The computer-executable instructions, when executed, also cause the computing device to cause an indication of the respective indication has been qualified to be stored in a second table maintained by the memory. The computer-executable instructions, when executed, further cause the computing device to cause information to be provided regarding the respective instruction that has been qualified.

The computing device of an example embodiment is further caused to cause a listing of people eligible to issue instructions to be stored in a third table maintained by the memory. In this example embodiment, the performance of one or more additional qualification tests include determining that an additional qualification test is satisfied in an instance in which the instruction is determined to have been issued by a person included in the listing of people eligible to issue instructions. The instruction of an example embodiment identifies a subject. In this example embodiment, the performance of one or more additional qualification tests includes determining that an additional qualification test is satisfied in an instance in which the subject of the instruction is determined to have been provided.

In an example embodiment, the performance of one or more additional qualification tests includes determining, in an instance in which the instruction fails to identify a subject, the subject of the instruction based upon other information included with the instruction and determining that an additional qualification test is satisfied in an instance in which the subject of the instruction that has been determined is thereafter determined to have been provided. The computer-executable instructions, when executed, further cause a computing device of an example embodiment to perform, in an instance in which the input site of the respective instruction is not included within the eligible input site inclusion listing, one or more further qualification tests in addition to the one or more additional qualification tests and to qualify the respective instruction in an instance in which the one or more additional and further qualification tests are satisfied.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A computing device, method and computer program product are provided in accordance with an example embodiment in order to qualify an instruction at least partially based upon an input site of an instruction, such as a written location at which a prescription is written. The computing device, method and apparatus may be configured to qualify instructions for any of a variety of different purposes including, for example, the qualification of instructions with respect to eligibility to participate in a respective program. Likewise, the computing device, method and computer program product may be configured to receive and analyze a plurality of different types of instructions for purposes of determining if the instructions qualify, or not. For example, the instructions may include instructions issued in the context of telecommunications or computer networking applications in which the instructions are reviewed and analyzed in order to determine whether the instructions qualify pursuant to a particular program, such as programs permitting mobile terminal access to a particular network or to certain network resources. As another example, the instructions may be prescriptions issued by a prescriber and analyzed to determine the eligibility of the prescription for a health care program, such as a 340B drug pricing program as described below.

Figure 1:
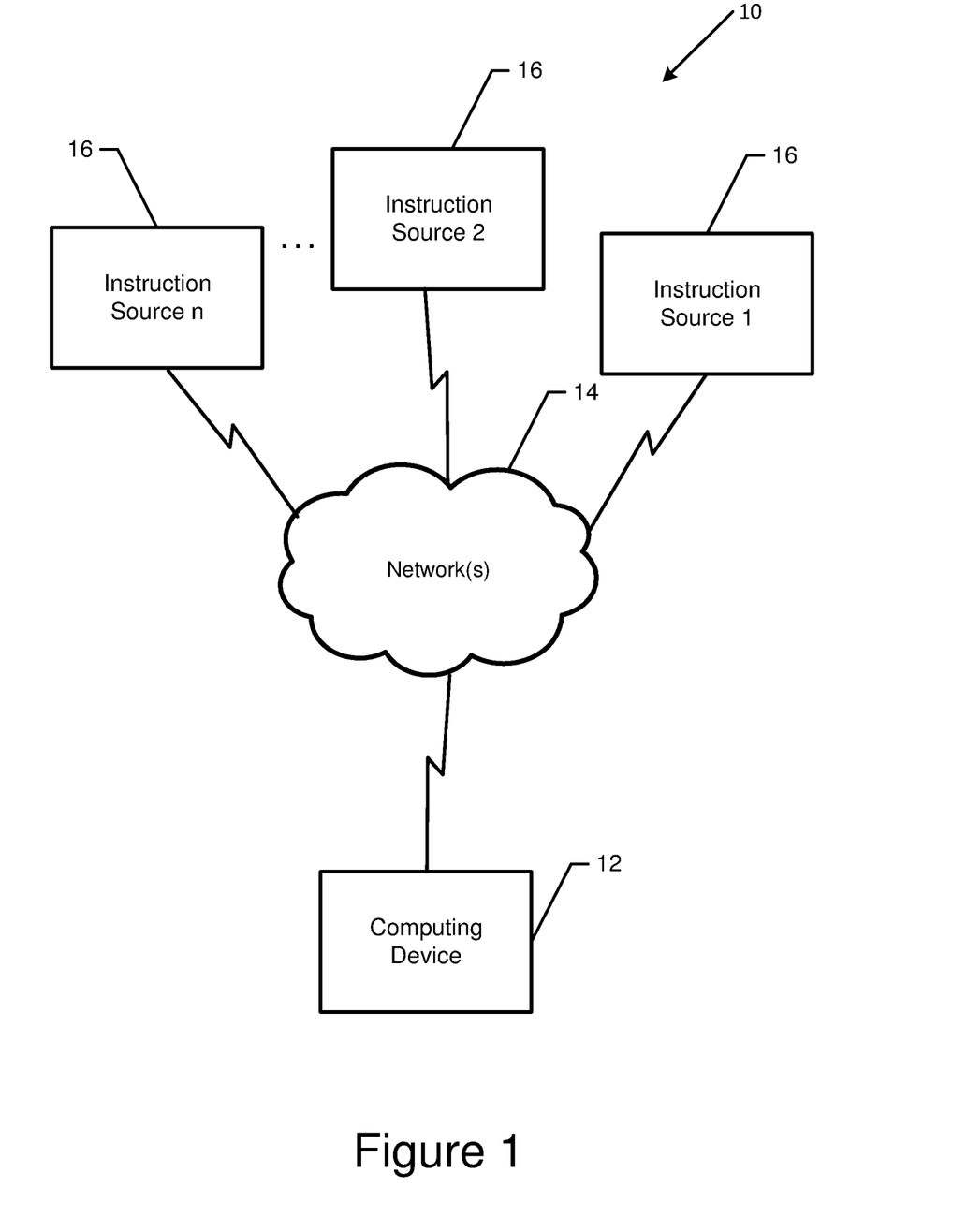
FIG. 1 is a diagram of a system including a computing device configured in accordance with an example embodiment of the present disclosure in order to receive and evaluate instructions from a plurality of sources.

The computing device, method and computer program product of example embodiments may be deployed in a variety of different system configurations. By way of example, FIG. 1 depicts a system 10 that includes a computing device 12 configured to communicate via a network 14 with one or more sources 16 of instructions. In this regard, the computing device may be configured to communicate with the sources of instruction via any of a wide variety of different types of networks including wireline networks, wireless networks or any combination thereof. The sources of instructions may also be of any of a wide variety depending upon, for example, the industry and the application for which the instructions are being qualified. As described below by way of a more particular example, the sources of instructions are generally embodied by computing devices and, in some instances, are computing systems that communicate with the computing device via the network in order to provide one or more instructions for evaluation by the computing device in order to determine if the one or more instructions are qualified, such as to participate in a program. As also described below, the computing device typically provides information to the sources of the instructions as to the qualification, or not, of the instructions that have been provided by the source and evaluated by the computing device.

The computing device may be embodied by any of a wide variety of different types of computers including a computer workstation, a server, a plurality of networked computers, a computer system or the like. Regardless of the manner in which the computing device is embodied, the computing device 12 of an example embodiment depicted in FIG. 2 includes, is associated with or is otherwise in communication with processing circuitry 20 and a communication interface 26. The processing circuitry may be configured to perform data processing, application execution and/or other processing and management services. The processing circuitry may include a processor 22 and memory 24 that may be in communication with or otherwise control the communication interface 26.

Figure 2:
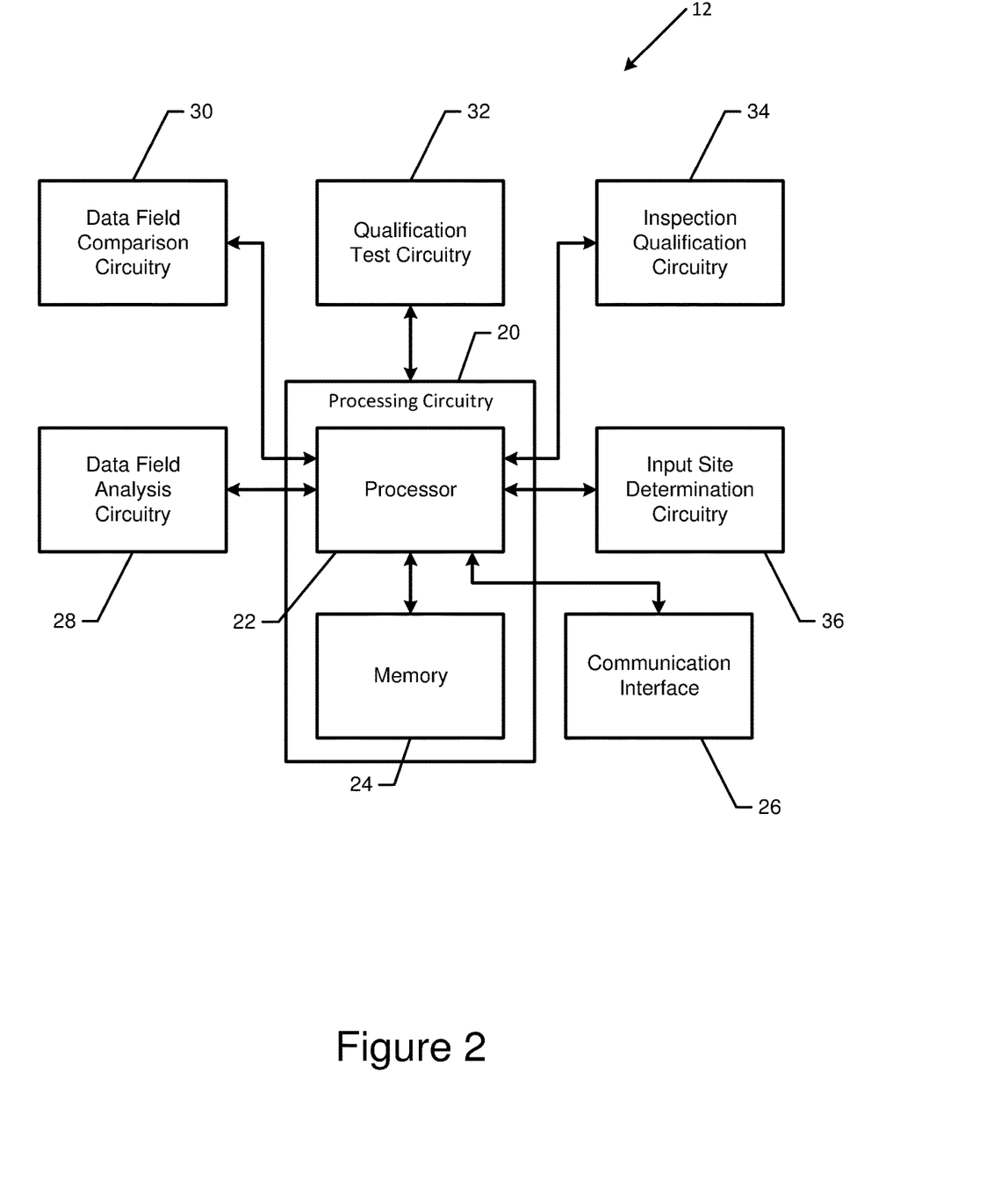
FIG. 2 is a block diagram of a computing device in accordance with an example embodiment of the present disclosure.

In an example embodiment, the memory 24 may include one or more non-transitory memory devices such as, for example, volatile and/or non-volatile memory that may be either fixed or removable. The memory may be configured to store information, data, applications, instructions or the like for enabling the computing device 12 to carry out various functions in accordance with example embodiments of the present invention. For example, the memory could be configured to buffer input data for processing by the processor 22. Additionally or alternatively, the memory could be configured to store instructions for execution by the processor.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 20) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein. In some embodiments, the computing device, as well as the processing circuitry, may be distributed with the processing circuitry including a plurality of processors or modules for performing different functions.

As shown in FIG. 2, the computing device 12 of an example embodiment may also include several specifically configured types of circuitry configured to perform different functions as described below. In this regard, the computing device of an example embodiment includes data field analysis circuitry 28, data field comparison circuitry 30, qualification test circuitry 32, inspection qualification circuitry 34 and optionally input site determination circuitry 36. In one embodiment, the processing circuitry 20, such as the processor 22, embodies one or more of the data field analysis circuitry, data field comparison circuitry, qualification test circuitry, inspection qualification circuitry and/or input site determination circuitry. Alternatively, the data field analysis circuitry, data field comparison circuitry, qualification test circuitry, inspection qualification circuitry and/or input site determination circuitry may be discrete circuitry, separate from, but in communication with, the processing circuitry. In this alternative embodiment, each of the data field analysis circuitry, data field comparison circuitry, qualification test circuitry, inspection qualification circuitry and/or input site determination circuitry may be embodied in any of the various manners described above with respect to the processor including embodiments comprised exclusively of hardware or embodiments in which the execution of software by hardware serves to specifically configure the hardware to perform the respective functions.

The communication interface 26 may include one or more interface mechanisms for enabling communication via the network 14 with one or more sources 16 of instructions. In this regard, the communication interface may include, for example, an antenna (or multiple antennas) and supporting hardware and/or software for enabling the communications therewith.

The operations performed, such as by the computing device 12, in accordance with an example embodiment are described below with reference to FIG. 3. In this regard, it is shown in block 40 of FIG. 3, the computing device of an example embodiment includes means, such as the processing circuitry 20, the processor 22, the memory 24 or the like, for storing an eligible input site inclusion listing. The eligible input site inclusion listing includes one or more input sites that are covered pursuant to a program as described below. The eligible input site inclusion listing is generally provided by a source 16 of instructions and includes one or more sites at which an instruction is permitted to be input. In instances in which the computing device evaluates instructions provided by a plurality of sources of instruction, each source of instruction may provide a different, respective eligible input site inclusion listing that is stored by the computing device and is utilized as described below in conjunction with instructions subsequently submitted by the respective source of instructions.

In an example embodiment, the memory defines a plurality of tables for purposes of memory organization and to facilitate efficient storage and retrieval of the data. As such, the memory of an example embodiment stores the eligible input site inclusion listing in a first table maintained by the memory.

As noted above, the computing device 12 may be utilized in conjunction with various industries and various applications. In one embodiment, however, the computing device is configured to evaluate and potentially qualify instructions in the form of prescriptions written by a prescriber, such as a physician, a physician's assistant or other healthcare professional, to a patient. In order to determine if such a prescription is qualified, such as for eligibility pursuant to the 340B drug pricing program, the prescription must satisfy various requirements including being written at a particular location, termed the written location, that has been previously authorized and is therefore covered.

The 340B drug pricing program is one of several government sponsored and non-government sponsored programs and entities that exist for providing reduced costs for prescription products such as prescription medications, medical devices, and other prescription products. Other examples of such programs or entities may include, for example, healthcare group purchasing organizations (GPOs), patient assistance programs (PAPs) available through pharmaceutical companies or governmental organizations such as Medicare or Medicaid, and so forth.

The 340B drug pricing program requires drug manufacturers to provide outpatient drugs to eligible healthcare centers, clinics, and hospitals (referred to as "covered entities") at a reduced price. This reduced price represents a price that a covered entity would have to pay for select prescription drugs dispensed on an outpatient basis and is often significantly lower than the Wholesale Acquisition Cost (WAC) price for such drugs.

In certain example scenarios, a covered entity may contract with a non-covered entity (e.g., a retail pharmacy) such that a covered entity may replenish the prescription drug at the 340B price despite the fact that a non-covered entity (the retail pharmacy) dispensed the drug. In such scenarios, the retail pharmacy may continue to purchase the drug at the WAC price while the covered entity may be allowed to replenish its own inventory of the drug at the 340B price. While the retail pharmacy may charge the covered entity a service fee under the contract, the arrangement may nonetheless be advantageous for the covered entity because the sum of the service charge and the 340B price for the drug may still be less (potentially significantly less) than the WAC price.

A "covered drug" under the 340B program may include, for example, a Federal Drug Administration (FDA) approved prescription drug, an over-the-counter (OTC) drug that is written on a prescription, and so forth. Covered entities eligible to participate in the 340B program generally include entities that serve indigent or historically disenfranchised populations or that focus on treating particular disease conditions such as, for example, federally-qualified health centers, hospitals that treat indigent patients through a disproportionate share hospital (DSH) program, children's hospitals, free standing cancer clinics, family planning projects, state-operated AIDS Drug Assistance Programs (ADAPs), black lung clinics receiving federal funds, and so forth. Prescription drug purchases at the 340B price represent a significant cost savings over the typical costs for such drugs. The cost savings can, in turn, be passed on to patients, thereby reducing the overall cost of patient care to both healthcare providers and patients.

The 340B program specifies a number of restrictions on the type of prescription drugs and the conditions under which such drugs must be prescribed and dispensed in order to qualify for 340B pricing. One such requirement may be that the prescription drug be a covered prescription drug that qualifies for 340B pricing. Another requirement may be that the prescription drug be dispensed to an outpatient. A further requirement is that the prescription be written at a location that has been qualified, a requirement that is determined by an example embodiment of the present disclosure.

It is often difficult for covered entities (e.g., hospital pharmacies) to effectively track the conditions under which prescription drugs are dispensed (e.g., whether a drug was dispensed to an outpatient or an inpatient), and thus, it may be difficult for covered entities to ensure that they are receiving the best possible price when replenishing their inventory (e.g., a 340B price). The computing device 12, method and computer program product of an example embodiment therefore assist covered entities in relation to qualification under the 340B drug pricing program.

Figure 4:
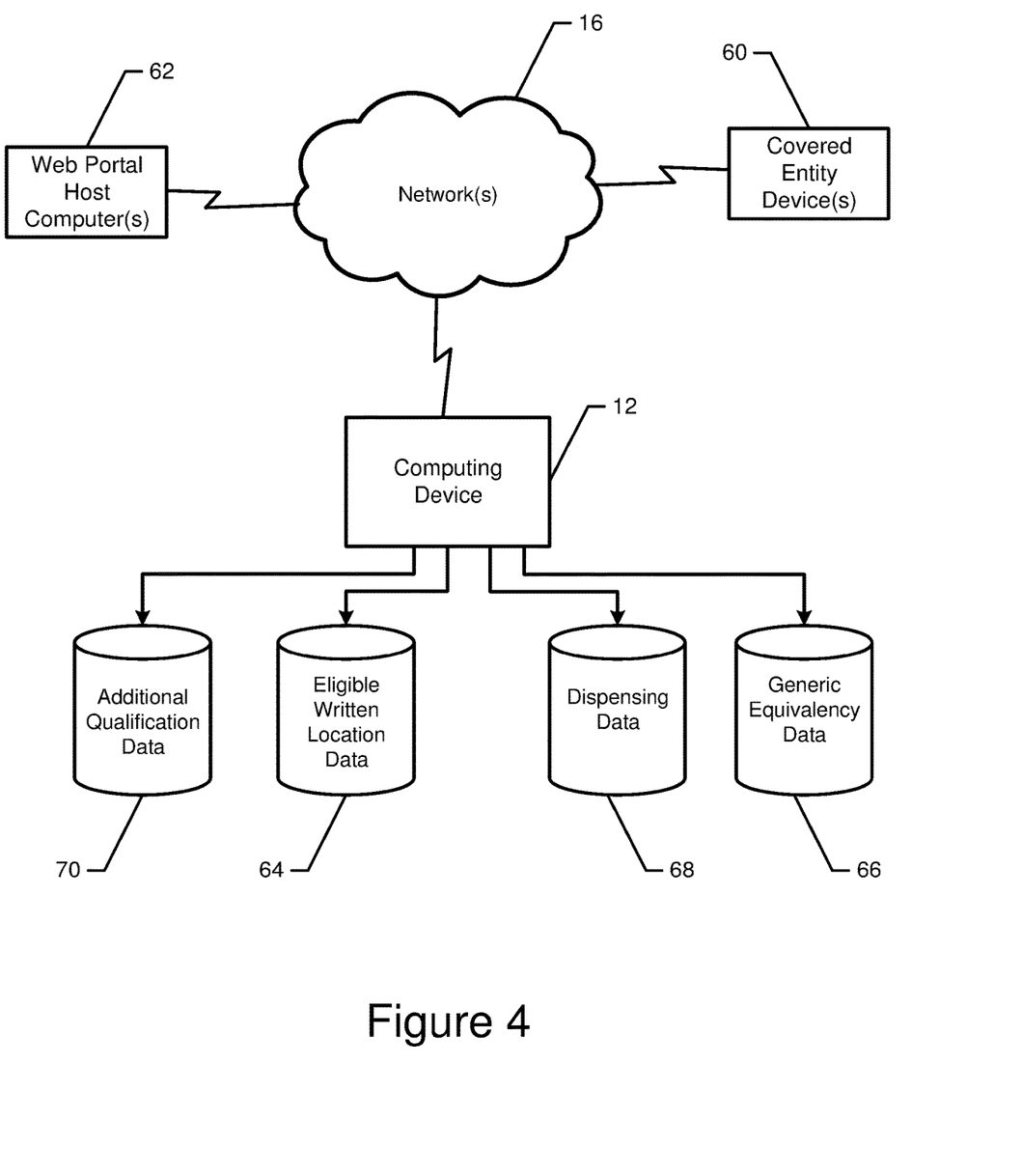
FIG. 4 is a diagram of a system in accordance with an example embodiment in which a computing device configured in accordance with an example embodiment of the present disclosure is configured to communicate with one or more covered entity devices in order to qualify instructions based, at least in part, upon data derived from one or more databases associated with the computing device.

In this example embodiment depicted in FIG. 4, the source of the instructions, such as a covered entity, e.g., a hospital or other healthcare facility, a pharmacy or the like, that has been previously qualified and therefore is considered covered pursuant to the 340B drug pricing program, provides the eligible input site inclusion listing, e.g., a written location inclusion listing in this example embodiment that identifies the written locations at or associated with covered entity from which instructions may be written which qualify pursuant to the 340B drug pricing program. In the embodiment of FIG. 4, for example, the covered entity may provide the eligible written location inclusion listing from a covered entity device 60, such as via a client portal that communicates via a web portal host computer 62 with the computing device. The eligible written location inclusion listing includes one or more written locations that are covered as described below. The computing device and, more particularly, the memory 24 then stores the eligible input site inclusion listing provided by the covered entity in a first table maintained thereby, such as shown in FIG. 4 by the database designated eligible input site data 64.

Figure 3:
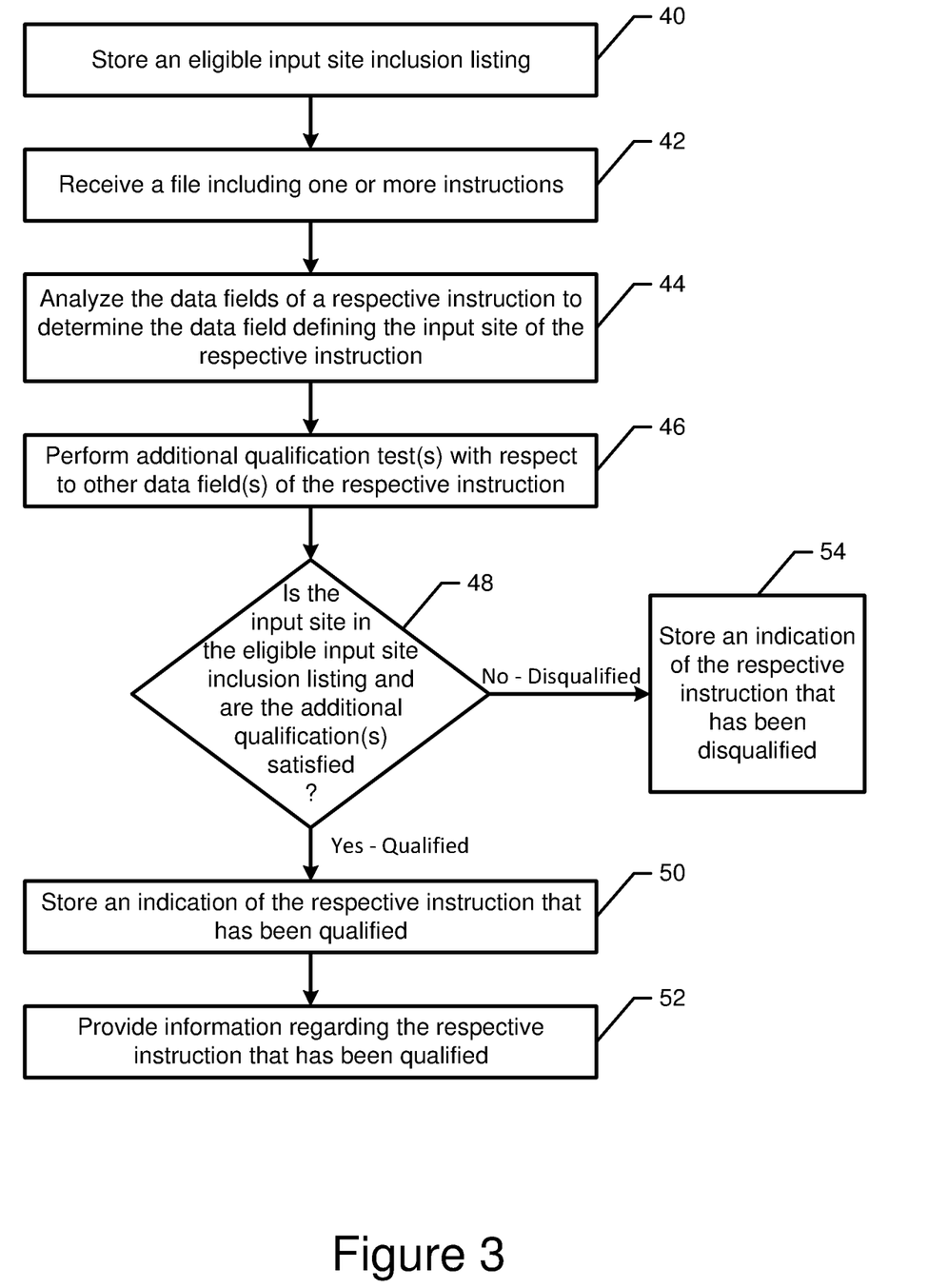
FIG. 3 is a flow chart of the operations performed, such as by the computing device of FIG. 2, in accordance with an example embodiment of the present disclosure.

As shown in block 42 of FIG. 3, the computing device 12 also includes means, such as the processing circuitry 20, the processor 22, the communication interface 26 or the like, for receiving a file including one or more instructions. Each instruction is represented by a plurality of data fields. At least one of the data fields defines the site at which the respective instruction was input. In conjunction with an embodiment in which the instruction is in the form of a prescription received from a covered entity, the prescriptions may be represented by a plurality of data fields including a data field defining the written location at which the respective prescription is written, as well as data fields defining the patient, date written, covered entity, the pharmacy at which the prescription is to be filled, the service location at which the patient encounter occurred (which may be different from the written location), the identification of the prescriber, the subject of the prescription, such as an identification of the drug being prescribed, e.g., the NDC of the drug, an indication of the particular visit, such as the visit number, an indication of the diagnosis, such as the diagnosis code and other parameters or characteristics of the prescription. Regardless of the type of instruction, the computing device, such as a memory 24, may also be configured to store the file including the one or more instructions, such as in a discreet table dedicated to the storage of files of this type provided by the various sources of instruction.

As shown in block 44 of FIG. 3, the computing device 12 also includes means, such as the processing circuitry 20, the processor 22, the data field analysis circuitry 28 or the like, for analyzing the data fields representing a respective instruction to determine the at least one data field that defines the site at which the respective instruction was input. In this regard, from among the plurality of data fields that comprise a respective instruction, the computing device, such as the processing circuitry, the processor, the data field analysis circuitry or the like, is configured to identify the particular data field defining the input site, e.g., written location. This determination may be performed in various manners including being based upon a predefined ordering of the data fields that comprise the instruction. As shown in block 46 of FIG. 3, the computing device also includes means, such as the processing circuitry, the processor, the data field comparison circuitry 30 or the like, for comparing the at least one data field that defines the input site of the respective instruction to the eligible input site inclusion listing to determine whether the input site of the respective instruction is included within the eligible input site inclusion listing. With respect to the instruction in the form of a prescription, for example, the computing device, such as the processing circuitry, the processor, the data field comparison circuitry or the like, is configured to compare the data field of the prescription that defines the written location at which the respective prescription was written to the eligible written location inclusion listing that defines the locations at which prescriptions are permitted to be written for the covered entity that submitted the prescription in order to determine whether the written location at which the respective prescription was written is included within the eligible written location inclusion listing.

Qualification does not generally depend only upon the input site of the instruction, but also on a number of other characteristics of the instruction satisfying predefined requirements. In this regard, the computing device 12 also includes means, such as the processing circuitry 20, the processor 22, the qualification test circuitry 32 or the like, for performing one or more additional qualification tests with respect to one or more other data fields of the respective instructions. The additional qualification tests that are performed may be dependent upon the particular industry and application in which the computing device is deployed. In the embodiment, such as depicted in FIG. 4, in which the computing device evaluates prescriptions at least partially based upon the written location at which the prescriptions are written for purposes of qualification pursuant to the 340B drug pricing program, the computing device, such as the processing circuitry, the processor, the qualification test circuitry or the like, is configured to perform one or more additional qualification tests to determine whether the entity, e.g., the hospital, oncology clinic or the like, that submitted the prescription for evaluation is a covered entity, whether the service location at which the patient encounter occurred is a covered location for patient encounters for the covered entity, whether the prescriber of the prescription is a covered prescriber for the covered entity and whether the subject of the prescription, that is, the drug that is prescribed, has actually been dispensed by a pharmacy as well as potentially other or different qualification tests.

With respect to the additional qualification tests involving the entity that submitted the prescription for evaluation, the service location at which the patient encounter occurred and the prescriber of the prescription, the information provided by respective data fields of the prescription that identifies the entity submitting the prescription, the service location of the patient encounter and the identity of the prescriber may be compared to a respective inclusion listings stored in respective tables maintained by the memory 24, such as in a databased designated additional qualification data 70 as shown in FIG. 4, such as a covered entity inclusion listing for entities that are covered pursuant to the 340B drug pricing program, a covered patient encounter location inclusion listing for locations that are covered at the respective covered entity for patient encounters and a covered prescriber inclusion listing for prescribers associated with the respective covered entity who are covered for purposes of writing prescriptions. Based upon these comparisons, the computing device 12, such as the processing circuitry 20, the processor 22, the qualification test circuitry 32 or the like, is configured to determine whether the entity is a covered entity, the service location which the patient encounter occurred is covered and whether the prescriber is covered for purposes of writing the prescription. Additional qualification tests or different qualification tests may be performed in other embodiments.

By way of example, with respect to the determination as to the eligibility of a person to issue instructions of the sort being evaluated, the memory 24 may also be configured to store, such as in a respective table, a listing of people eligible to issue instructions, such as for the source that provided the instruction for evaluation. With respect to the evaluation of a prescription with respect to qualification pursuant to a 340B drug pricing program, the memory may store, such as in a respective table, a covered prescriber listing of prescribers eligible to issue prescriptions of the type that is being evaluated on behalf of the entity that submitted the prescription for evaluation. In this example embodiment, the computing device 12, such as the processing circuitry 20, the processor 22, the qualification test circuitry 32 or the like, is configured to determine that an additional qualification test relating to the person issuing the instruction is satisfied in an instance in which the instruction is determined to have been issued by a person included in the listing of people eligible to issue instructions. For example, the additional qualification test relating to whether a prescriber is covered may be satisfied in an instance in which the prescription is determined to have been written by a prescriber included in the covered prescriber inclusion listing of people eligible to issue prescriptions of the type being evaluated on behalf of the entity that submitted the prescription for evaluation.

In some embodiments, another additional test relates to a provision of the subject of the instruction, such as the dispensation of the drug that is the subject of the prescription. In an instance in which the instruction identifies a subject, such as in an instance in which a prescription identifies the drug to be dispensed in accordance with the prescription, such as by the NDC of the drug, the computing device 12, such as the processing circuitry 20, the processor 22, the qualification test circuitry 32 or the like, is configured to determine that an additional qualification test is satisfied in an instance in which the subject of the instruction is determined to have been provided. With respect to a prescription, the computing device, such as the processing circuitry, the processor, the qualification test circuitry or the like, is configured to determine that an additional qualification test is satisfied in an instance in which the drug that is the subject of the prescription is determined to have been dispensed, such as by a pharmacy. In conjunction with the dispensation of a drug by a pharmacy, the computing device may be configured to receive information from a service provider, such as a switch, that processes messages, such as prescription benefit coverage request message submitted, for example, by pharmacy management system, and accumulates information relating to the prescriptions filled and the drugs dispensed by one or more pharmacies. As shown in the embodiment of FIG. 4, the memory may store the dispensing data provided by the service provider, such as the switch, relating to the prescriptions filed and the drugs dispensed by one or more pharmacies, such as in the database designated dispensing data 66. By matching the prescription that is being evaluated with the prescription that has been filled for the same patient and confirming that the drug that is the subject of the prescription that is being evaluated has actually been dispensed to the patient, this additional qualification test may be satisfied.

In some embodiments, the drug that is identified by the prescription by its NDC may not be dispensed, but another equivalent drug, such as a generic equivalent, having a different NDC may be dispensed, therefore similarly satisfying this additional qualification test. Thus, the computing device 12, such as the memory 24 and, in one embodiment depicted in FIG. 4, a database designated generic equivalency data 68 maintained by the memory, may include information regarding drugs that are considered to be the equivalent of one another, such as generic drugs that are considered to be equivalent to various brand name drugs. Thus, the computing device, such as the processing circuitry 20, the processor 22, the qualification test circuitry 32 or the like, may be configured to compare the dispensing data 66 provided by the service provider, such as a switch, regarding the prescriptions that have been filled and the drugs that have been dispensed to the prescription being evaluated to determine not simply that the specific drug as identified by NDC by the prescription has been dispensed to the patient, but if, instead, a generic equivalent for the drug identified by NDC by the prescription being evaluated has been dispensed to the patient, in which case the additional qualification test is correspondingly satisfied.

In some instances, the instruction fails to identify a subject. For example, a prescription may fail to identify the NDC of the drug being prescribed. In this example embodiment, the computing device 12, such as the processing circuitry 20, the processor 22, the qualification test circuitry 32 or the like, is configured to determine the subject of the instruction based upon other information included with the instruction and to then determine that an additional qualification test is satisfied in an instance in which the subject of the instruction that has been determined is determined to have been provided. With respect to the fulfillment of a prescription, in an instance in which the drug for which the prescription being evaluated is not identified by an NDC, the computing device, such as the processing circuitry the processor, the qualification test circuitry or the like, may be configured to determine the drug that is the subject of the prescription by considering information provided by other data fields of the prescription, such as the visit number, the diagnosis code and the like. Based upon this other information provided by the prescription, the computing device, such as the processing circuitry, the processor, the qualification test circuitry or the like, is configured to determine the drug to be dispensed, such as based upon predefined associations stored by the memory 24, such as in a respective table defined by the memory, that associate particular drugs with the respective diagnosis code. Once the drug has been determined that is the subject of the prescription, the computing device, such as the processing circuitry, the processor, the qualification test circuitry or the like, is configured to compare the drug that has been determined to be the subject of the prescription with the drug that is dispensed during the fulfillment of the prescription, based upon, for example, the dispensing data 66, in order to determine if the same drug or a drug that is considered equivalent has been dispensed to the same patient and, if so, to note that the additional qualification test has been satisfied.

As described above, the drug that is prescribed may be matched with the drug dispensed during the fulfillment of the prescription based upon the NDC of the prescribed drug or based upon other information provided by the prescription, such as the visit number, the diagnosis code and the like. However, the prescription of an example embodiment also includes an additional data field containing an identifier that is unique for a respective prescription. Thus, each prescription has its own unique identifier. The unique identifier is not only provided to the computing device 12 with the prescription, but the unique identifier is provided to the pharmacy that dispenses the drug. The pharmacy, in turn, provides the unique identifier to the service provider, such as the switch, such that the information that is received by the computing device from the service provider also includes the unique identifier. Thus, the computing device, such as the processing circuitry 20, the processor 22, the qualification test circuitry 32 or the like, can confirm that the prescription has been fulfilled by identifying that the drug has been dispensed by the pharmacy pursuant to the prescription identified by the unique identifier.

As shown in block 48 of FIG. 3, the computing device 12 includes means, such as the processing circuitry 20, the processor 22, the instruction qualification circuitry 34 or the like, for determining whether the input site of the respective instruction is included within the eligible input site inclusion listing and whether the one or more additional qualification test are satisfied. If both of these criteria are satisfied, the computing device, such as the processing circuitry, the processor, the instruction qualification test circuitry or the like, is configured to qualify the respective instruction, such as for eligibility for a respective program. Alternatively, if either or both of the foregoing considerations are not satisfied, the computing device, such as the processing circuitry, the processor, the instruction qualification test circuitry or the like, is configured to disqualify the respective instruction. Thus, with respect to a prescription, the computing device, such as the processing circuitry, the processor, the instruction qualification test circuitry or the like, is configured to determine whether the written location at which the respective prescription was written is included within the eligible written location inclusion listing for the covered entity that submitted the prescription and to also determine whether one or more additional qualification tests, such as additional qualification test relating to the covered entity, the prescriber, the service location at which the patient encounter occurred, the dispensation of the drug for which the prescription was written or the like, have also been satisfied and, if so, to qualify the respective prescription, such as for the 340B drug pricing program.

While some embodiments consider the input site only in the manner described above in which the input site of a respective instruction is determined to either be included, or not, based solely upon a comparison to the eligible image site inclusion listing, the computing device 12 of other embodiments is configured to perform an additional test relating to the input site in an instance in which the site at which the respective instruction was input is determined not to have been included within the eligible input site inclusion listing. In this example embodiment, the computing device further includes means, such as the processing circuitry 20, the processor 22, the image site determination circuitry 36 or the like, for performing, in an instance in which the site at which the respective instruction was input is not included within the eligible input site inclusion listing, one or more further qualification tests. These one or more further qualification tests are in addition to the one or more additional qualification tests described above, such as may be performed by the qualification test circuitry 32.

In an embodiment in which a prescription is evaluated to determine if the prescription qualifies, such as for eligibility for a 340B drug pricing program, the failure of the written location of the prescription to be included in the eligible written location inclusion listing may cause the computing device 12, such as the processing circuitry 20, the processor 22, the input site determination circuitry 36 or the like, to perform further qualification tests that are configured to determine whether the written location is likely a covered location even though the written location does not appear within the eligible written location inclusion listing. While this determination may be made in various manners, the computing device, such as the processing circuitry, the processor, the input site determination circuitry or the like, of an example embodiment is configured to consider various other pieces of information provided by other data fields of the prescription in order to make this determination. The other data fields that are considered may include the service location of the patient encounter, the diagnosis code, the visit number and the like from which the computing device, such as the processing circuitry, the processor, the input site determination circuitry or the like, may be configured to determine whether the written location should in fact be considered to be covered. By way of example, but not of limitation, the determination as to whether the written location should be considered to be covered may include a determination as to whether the patient has a visit or encounter at a valid location, whether, in an instance in which an antibiotic is prescribed, the diagnosis code corresponds to the prescription of an antibiotic, whether, in an instance in which a pain medication is prescribed, the diagnosis code corresponds to the prescription of pain medication, whether the patient is included in an approved patient list and/or whether the date on which the prescription is written equals the encounter date. In this example embodiment, the computing device, such as the processing circuitry, the processor, the instruction qualification circuitry 34 or the like, is also configured, in the instance in which the site at which the respective instruction was input is not included within the eligible input site inclusion listing, to qualify the respective instruction in an instance in which the one or more additional and further qualification test are satisfied.

In an instance in which the instruction has been qualified, the computing device 12, such as the processing circuitry 20, the processor 22, the memory 24 or the like, is configured to store an indication of the respective instruction has been qualified, such as in a second table maintained by the memory. Correspondingly, the computing device, such as the processing circuitry, the processor, the memory or the like, may be configured to store an indication of the respective instruction that has been disqualified, such as in a different table maintained by the memory.

Additionally, the computing device 12 of an example embodiment includes means, such as the processing circuitry 20, the processor 22, the communication interface 26 or the like, for providing information regarding the respective instruction that has been qualified and, in some embodiments, also providing information regarding an instruction that has been disqualified. This information may be provided, for example, to the source 16 of the instruction that was evaluated. In relation to the information provided regarding the respective instruction has been qualified, the type of information may depend upon the industry and application for which the instruction is being evaluated. With respect to the qualification of a prescription including the determination that the written location at which the prescription was written is a covered written location, information may be provided indicating the qualification of the prescription for the 340B drug pricing program such that the covered entity or the pharmacy that dispenses the drug that is the subject of the prescription may thereafter be entitled to received replenishment of the particular drug that was dispensed at a reduced price pursuant to the 340B drug pricing program. In addition or alternatively, the information regarding the qualified prescription may include a report identifying the prescriptions that have been qualified or other statistics related thereto to allow the covered entity to evaluate their participation within the respective program, such as a 340B drug pricing program.

From the perspective of the source 16 of the instructions, such as a covered entity, the eligible input site inclusion listing may be provided, such as for storage by the memory 24 and subsequent reference by the computing device 12. Thereafter, instructions to be evaluated may be submitted, such as by submitting a file including one or more instructions, each of which has a plurality of data fields. As described above, the data fields of each instruction include the site at which the respective instruction was input. Thus, in conjunction with the evaluation of a prescription, a file including a plurality of prescriptions may be provided with one or more data fields of each prescription identifying the written location at which the prescription was written. The written location of a prescription may be defined in various manners. In one embodiment, however, the written location of a prescription written on a computer may be automatically captured, such as by the computer, and set equal to the location of the computer. The location of the computer and, in turn, the written location of the prescription may be determined in various manners including, for example, based upon a predefined information associating the computer, e.g., the IP address of the computer, to a particular location, based on location detection services, such as global positioning system (GPS) services or the like. The eligible input site inclusion listing and the file containing one or more instruction may be provided in various manners including directly from the source of the instructions to the computing device or via a web hosting computer 62 as shown, for example, in the embodiment of FIG. 4.

Following the evaluation of the instruction by the computing device 12, the covered entity may receive information regarding the respective instruction including an indication as to whether the respective instruction has been qualified or disqualified. With respect to the qualification of a prescription pursuant to the 340B drug pricing program, the covered entity may receive an indication as to whether a prescription is qualified pursuant to the 340B drug pricing program which includes a determination as to whether the prescription has been written at a written location that is covered pursuant to the 340B drug pricing program, or not. Based upon the information, the covered entity may evaluate the prescriptions that are considered to be qualified and may correspondingly receive replenishment of the drugs for which prescriptions have been qualified pursuant to the 340B drug pricing program at a reduced at no cost to the covered entity.

By considering the actual input site of the instruction during the qualification process in the manner described above, the computing device 12, method and computer program product of an example embodiment may determine whether the input site satisfies the qualification requirement in a more accurate manner than prior approaches that relied upon an analysis of other data fields in the prescription to approximate the input site. As such, the resulting qualification determination is correspondingly established in a more accurate manner. Further, by considering the actual input site of the instruction, the computing device, method and computer program product of an example embodiment may eliminate one or more qualification tests that have sometimes been previously performed to approximate the input site, thereby increasing the efficiency of the qualification process and correspondingly reducing the processing resources and the processing time required to more accurately qualify an instruction, such as for program eligibility. As an example in the context of a prescription, covered entities may submit patient encounter reports containing data related to the patient and the diagnosis information. The patient encounter reports are utilized to establish a relationship between a patient and a covered entity, to determine orphan drug qualifications using diagnosis codes, etc. in order to qualify prescriptions for the 340B drug pricing program. By utilizing the input site in the qualification logic, the computing device, method and computer program product may eliminate the need for the submission of the patient encounter reports and the processing required to evaluate the patient encounter reports and to extract the data values therefrom. Thus, the computing device, method and computer program product of an example embodiment reduce network traffic and subsequent processing, thereby further increasing the efficiency of the qualification process.

As noted above, FIG. 3 is a flowchart illustrating the operations performed by a method, apparatus and computer program product, such as computing device 12 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of a computing device employing an embodiment of the present invention and executed by a processor 22 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to qualify a prescription at least partially based upon an input site of the prescription, the computing device comprising:
    a memory defining a plurality of tables and configured to store an eligible input site inclusion listing in a first table, wherein the eligible input site inclusion listing includes one or more input sites at which a prescription associated with a drug pricing reduction program is permitted to be input, wherein the one or more sites of the eligible input site inclusion listing comprise one or more healthcare facilities at which a prescription has been authorized to be written in accordance with the drug pricing reduction program;
    a communication interface configured to receive a file including one or more prescriptions, each prescription represented by a plurality of data fields, wherein at least one data field defines an input site of a respective prescription;
    data field analysis circuitry configured to analyze the data fields representing a respective prescription to determine the at least one data field that defines the input site of the respective prescription, wherein the input site of the respective prescription comprises a healthcare facility at which the respective prescription was written;
    data field comparison circuitry configured to compare the at least one data field that defines the input site of the respective prescription to the eligible input site inclusion listing to determine whether the input site of the respective prescription is included within the eligible input site inclusion listing;
    qualification test circuitry configured to perform one or more additional qualification tests with respect to one or more other data fields of the respective prescription; and
    instruction qualification circuitry configured, in an instance in which the input site of the respective prescription is included within the eligible input site inclusion listing and in which the one or more additional qualification tests are satisfied, to qualify the respective prescription,
    wherein the memory is further configured to store in a second table an indication of the respective prescription that has been qualified, and
    wherein the communication interface is further configured to provide information regarding the respective prescription that has been qualified.

2. A computing device according to claim 1 wherein the memory is also configured to store in a third table a listing of people eligible to issue prescriptions, and wherein the qualification test circuitry is configured to determine that an additional qualification test is satisfied in an instance in which the prescription is determined to have been issued by a person included in the listing of people eligible to issue prescriptions.

3. A computing device according to claim 1 wherein the prescription identifies a subject, and wherein the qualification test circuitry is configured to determine that an additional qualification test is satisfied in an instance in which the subject of the prescription is determined to have been provided.

4. A computing device according to claim 1 wherein in an instance in which the prescription fails to identify a subject, the qualification test circuitry is configured to determine the subject of the prescription based upon other information included with the prescription and to determine that an additional qualification test is satisfied in an instance in which the subject of the prescription that has been determined is thereafter determined to have been provided.

5. A computing device according to claim 1 further comprising input site determination circuitry configured to perform, in an instance in which the input site of the respective prescription is not included within the eligible input site inclusion listing, one or more further qualification tests in addition to the one or more additional qualification tests performed by the qualification test circuitry, and wherein the instruction qualification circuitry is also configured, in the instance in which the input site of the respective prescription is not included within the eligible input site inclusion listing, to qualify the respective prescription in an instance in which the one or more additional and further qualification tests are satisfied.

6. A computing device according to claim 1 wherein the input site of the respective prescription is based upon predefined information associating a computer at which the prescription was written with a geographical location associated with the healthcare facility.

7. A computing device according to claim 6 wherein the predefined information associates an address of the computer at which the prescription was written with the geographical location that is based on location detection services.

8. A computing device according to claim 7 wherein the location detection services comprise global positioning system (GPS) services.

9. A computing device according to claim 3 wherein the subject is a prescribed drug associated with the prescription.

10. A method for qualifying a prescription at least partially based upon an input site of the prescription, the method comprising:
  storing an eligible input site inclusion listing in a first table maintained by memory, wherein the eligible input site inclusion listing includes one or more input sites at which a prescription associated with a drug pricing reduction program is permitted to be input, wherein the one or more sites of the eligible input site inclusion listing comprise one or more healthcare facilities at which a prescription has been authorized to be written in accordance with the drug pricing reduction program;
  receiving, via a communication interface, a file including one or more prescriptions, each prescription represented by a plurality of data fields, wherein at least one data field defines an input site of a respective prescription;
  analyzing, with data field analysis circuitry, the data fields representing a respective instruction to determine the at least one data field that defines the input site of the respective prescription, wherein the input site of the respective prescription comprises a healthcare facility at which the respective prescription was written;
  comparing, with data field comparison circuitry, the at least one data field that defines the input site of the respective prescription to the eligible input site inclusion listing to determine whether the input site of the respective prescription is included within the eligible input site inclusion listing;
  performing, with qualification test circuitry, one or more additional qualification tests with respect to one or more other data fields of the respective prescription;
  in an instance in which the input site of the respective prescription is included within the eligible input site inclusion listing and in which the one or more additional qualification tests are satisfied, qualifying, with instruction qualification circuitry, the respective prescription;
  storing in a second table maintained by the memory an indication of the respective prescription that has been qualified, and
  providing information, via the communication interface, regarding the respective prescription that has been qualified.

11. A method according to claim 10 further comprising storing in a third table maintained by the memory a listing of people eligible to issue prescriptions, and wherein performing one or more additional qualification tests comprises determining, with the qualification test circuitry, that an additional qualification test is satisfied in an instance in which the prescription is determined to have been issued by a person included in the listing of people eligible to issue prescriptions.

12. A method according to claim 10 wherein the prescription identifies a subject, and wherein performing one or more additional qualification tests comprises determining, with the qualification test circuitry, that an additional qualification test is satisfied in an instance in which the subject of the prescription is determined to have been provided.

13. A method according to claim 10 wherein performing one or more additional qualification tests comprises determining, in an instance in which the prescription fails to identify a subject, the subject of the prescription based upon other information included with the prescription and determining that an additional qualification test is satisfied in an instance in which the subject of the prescription that has been determined is thereafter determined to have been provided.

14. A method according to claim 10 further comprising:
  in an instance in which the input site of the respective prescription is not included within the eligible input site inclusion listing, performing, with input site determination circuitry, one or more further qualification tests in addition to the one or more additional qualification tests performed by the qualification test circuitry and qualifying, with the instruction qualification circuitry, the respective prescription in an instance in which the one or more additional and further qualification tests are satisfied.

15. A method according to claim 10 wherein the input site of the respective instruction is based upon predefined information associating a computer at which the prescription was written with the geographical location.

16. A computer program product comprising at least one non-transitory computer-readable storage medium for qualifying a prescription at least partially based upon an input site of the prescription, the at least one non-transitory computer-readable storage medium storing computer-executable instructions that, when executed, cause a computing device to:
  cause an eligible input site inclusion listing to be stored in a first table maintained by memory, wherein the eligible input site inclusion listing includes one or more input sites at which a prescription associated with a drug pricing reduction program is permitted to be input, wherein the one or more sites of the eligible input site inclusion listing comprise one or more healthcare facilities at which a prescription has been authorized to be written in accordance with the drug pricing reduction program;
  receive a file including one or more prescriptions, each prescription represented by a plurality of data fields, wherein at least one data field defines an input site of a respective prescription;
  analyze the data fields representing a respective prescription to determine the at least one data field that defines the input site of the respective prescription, wherein the input site of the respective prescription comprises a healthcare facility at which the respective prescription was written;
  compare the at least one data field that defines the input site of the respective prescription to the eligible input site inclusion listing to determine whether the input site of the respective prescription is included within the eligible input site inclusion listing;
  perform one or more additional qualification tests with respect to one or more other data fields of the respective prescription;
  in an instance in which the input site of the respective prescription is included within the eligible input site inclusion listing and in which the one or more additional qualification tests are satisfied, qualify the respective prescription;
  cause an indication of the respective prescription that has been qualified to be stored in a second table maintained by the memory; and
  cause information to be provided regarding the respective prescription that has been qualified.

17. A computer program product according to claim 16 wherein the computing device is further caused to cause a listing of people eligible to issue prescriptions to be stored in a third table maintained by the memory, and wherein performing one or more additional qualification tests comprises determining that an additional qualification test is satisfied in an instance in which the prescription is determined to have been issued by a person included in the listing of people eligible to issue prescriptions.

18. A computer program product according to claim 16 wherein the prescription identifies a subject, and wherein performing one or more additional qualification tests comprises determining that an additional qualification test is satisfied in an instance in which the subject of the prescription is determined to have been provided.

19. A computer program product according to claim 16 wherein performing one or more additional qualification tests comprises determining, in an instance in which the prescription fails to identify a subject, the subject of the instruction based upon other information included with the prescription and determining that an additional qualification test is satisfied in an instance in which the subject of the prescription that has been determined is thereafter determined to have been provided.

20. A computer program product according to claim 16 wherein the computing device is further caused to:
   in an instance in which the input site of the respective prescription is not included within the eligible input site inclusion listing, perform one or more further qualification tests in addition to the one or more additional qualification tests performed by the qualification test circuitry and qualify the respective prescription in an instance in which the one or more additional and further qualification tests are satisfied.

* * * * *